Nov. 12, 1940.  C. M. MOORE  2,221,487
DISPENSING DEVICE FOR DETERGENTS
Filed Sept. 7, 1939
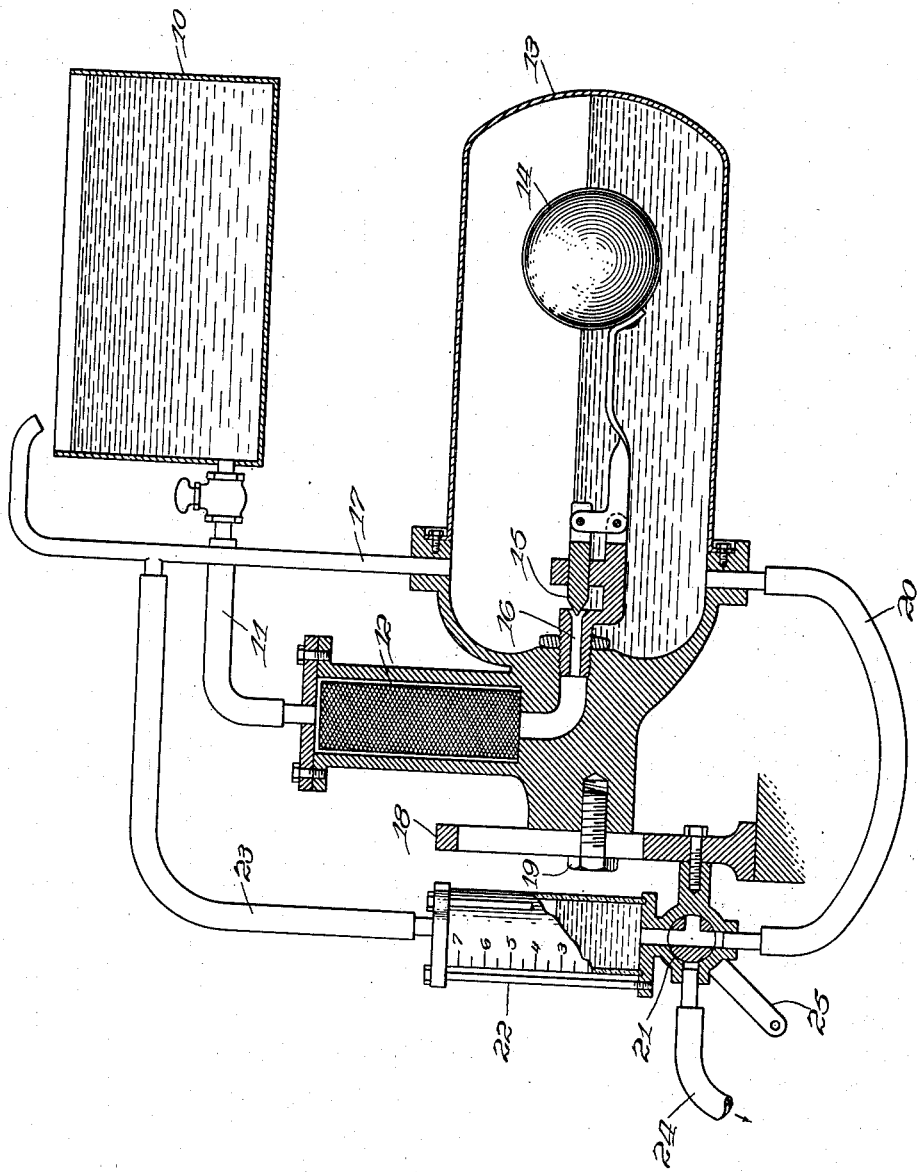
Inventor:
Clark M. Moore.
By Chritton, Wiles, Davies, Hirschl and Dawson.
Atty's.

Patented Nov. 12, 1940

2,221,487

UNITED STATES PATENT OFFICE 2,221,487

DISPENSING DEVICE FOR DETERGENTS

Clark M. Moore, Evanston, Ill., assignor to The Diversey Corporation, a corporation of Illinois Application September 7, 1939, Serial No. 293,845

2 Claims. (Cl. 221—116)

This invention relates to a dispensing device for detergent solutions, and more particularly to a dispensing device which is adapted to be operated automatically by a washing machine, such as a dish, can, bottle, bakepan, or metal washing machine.

In the operation of washing devices, particularly dish washing devices, the maintenance of a proper proportion of detergent in the washing liquid is a considerable problem which, up to the present invention, had not been satisfactorily solved. It is advisable that the amount of detergent fed into the system be automatically regulatable, but in practice it has been difficult to do this because in the supply line the detergent solution will have a varying height and, therefore, there will be a varying pressure and flow, and also because if attempts are made to interpose a control connected to the machine, the speed of operation has no necessary relationship to the amount of detergent required. Moreover, a device controlled merely by a head of liquid is highly unsatisfactory because the viscosity may vary greatly, and a slight variation in the available cross-sectional area of the connections will destroy the accuracy of the device.

By means of the present invention both of these difficulties and other difficulties, which will occur to those familiar with the problem, are overcome by the provision in combination of a detergent float chamber of constant level and a variable volume measuring chamber, the operation of which is made independent of the speed of operation of the machine.

The invention is illustrated in the drawing, in which the figure is an elevational view partly in section of the device. In the drawing 10 indicates a detergent reservoir of large volume, and 11 represents a connection leading therefrom through a screen or filter 12 to a float chamber 13. The float chamber is of relatively small volume, compared with that of the reservoir, and is provided with a float 14 suitably connected with a valve 15 which opens and closes the outlet 16 of the line 11. The float chamber is provided with an air vent 17 which rises to a level above that of the liquid in the reservoir 10. The entire float chamber is movably mounted upon a standard 18, to which it is detachably secured as by the bolt 19. Upward or downward movement of the float chamber need not affect the reservoir inasmuch as the line 11 is preferably flexible. The second flexible connection 20 connects the float chamber through a three-way cock 21 with the graduated, transparent, measuring chamber 22. The measuring chamber is provided with an air vent 23 which is vented above the liquid level in the reservoir 10. A line 24 leads from the three-way cock 21 to the washing device, which is not shown.

The three-way cock is actuated by the lever arm 25, which is adapted to be attached in any suitable fashion to a moving part of the washing mechanism or an independent or synchronized source of power.

In the operation of the device, the reservoir is filled with a solution of any suitable detergent composition. This solution passes through the line 11 and the filter 12, out of the orifice 16 and into the float chamber 13. During this operation the three-way cock may be in the position shown in the drawing, and the liquid in the float chamber and in the measuring chamber accordingly rises to the same level. When the float chamber has filled to its constant level, no more liquid flows in. At this stage the levels in the float chamber and in the measuring chamber are as indicated in the drawing. The washing mechanism may then be started, whereupon in due course the lever arm 25 is actuated to turn the three-way cock one-quarter revolution in a counter-clockwise direction, thereby connecting the measuring chamber to the line 24 and emptying the chamber. Shortly thereafter the actuating mechanism is timed to restore the valve to its original position, again permitting the measuring chamber to fill to the desired level. The actuating mechanism is timed so that, after the filling has occurred, the valve is again turned to withdrawal position. It will thus be seen that the measuring chamber comprises, in the combination here disclosed, what may be designated as a liquid lost motion device which overcomes any irregularities in the speed of operation of the washing mechanism or delivery of the detergent due to changes in viscosity or otherwise. It will be obvious that the connections are all made large so that the measuring chamber will fill and empty in very much less than the time available.

By adjusting the level of the float chamber 13 with respect to the level of the measuring chamber, the amount of detergent dispensable in any given cycle can be varied within the limits of the size of the measuring chamber. Where desired, the measuring chamber may be made adjustable instead of the float chamber, this being purely a matter of convenience. It has generally been found that it is simpler to adjust the level of the float chamber, particularly where the lever arm 25 is connected to automatic actuating mechanism.

At the start of any washing cycle the lever arm 25 may be operated manually to introduce any desired amount of detergent solution to produce a desired concentration thereof in the washer. After the operation has commenced, the machine automatically maintains this concentration.

The valves employed are particularly advantageous because they are always either open completely or closed completely and therefore do not clog because of evaporation of solvent.

What I claim as new, and desire to secure by Letters Patent, is:

1. A dispensing device for detergent solutions comprising a reservoir for a detergent solution, a float chamber connected therewith, a graduated measuring chamber connected with the float chamber, means for varying the relative heights of the float chamber and measuring chamber whereby the amount of detergent dispensable from the measuring chamber may be varied, a discharge opening from the measuring chamber, and a three-way valve connecting the float chamber, measuring chamber, and discharge opening.

2. The combination of a graduated measuring chamber for liquid, a float chamber having a float valve adapted to maintain a liquid level therein, a flexible tube connecting the measuring chamber and float chamber, a discharge outlet, a three way valve adapted alternately to connect the measuring chamber to the float chamber, and to the discharge opening, means for raising or lowering the float chamber in relation to the measuring chamber, whereby the volume of liquid in the measuring chamber may be varied, and means for supplying fresh solution to the float chamber.

CLARK M. MOORE.